US 8,135,969 B2

United States Patent
Kawakami

(10) Patent No.: US 8,135,969 B2
(45) Date of Patent: Mar. 13, 2012

(54) STORAGE APPARATUS AND DISK DEVICE CONTROL METHOD

(75) Inventor: Norihiko Kawakami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 784 days.

(21) Appl. No.: 12/196,362

(22) Filed: Aug. 22, 2008

(65) Prior Publication Data

US 2009/0319811 A1  Dec. 24, 2009

(30) Foreign Application Priority Data

Jun. 20, 2008  (JP) ................................. 2008-161987

(51) Int. Cl.
*G06F 1/26* (2006.01)
(52) U.S. Cl. ...................................... 713/320
(58) Field of Classification Search .................. 713/320
See application file for complete search history.

(56) References Cited

U.S. PATENT DOCUMENTS

| 6,016,530 | A * | 1/2000 | Auclair et al. ..................... 711/6 |
| 6,233,693 | B1 * | 5/2001 | Berglund et al. ............. 713/340 |
| 2004/0243761 | A1 * | 12/2004 | Bohrer et al. .................. 711/114 |
| 2005/0210304 | A1 * | 9/2005 | Hartung et al. ................ 713/320 |
| 2006/0090098 | A1 * | 4/2006 | Le et al. ............................ 714/6 |
| 2006/0193073 | A1 | 8/2006 | Hakamata et al. |
| 2008/0040543 | A1 | 2/2008 | Yamazaki et al. |
| 2010/0011229 | A1 * | 1/2010 | Davis et al. ................... 713/300 |

FOREIGN PATENT DOCUMENTS

| JP | 2000-10678 | 1/2000 |
| JP | 2000-293314 | 10/2000 |
| JP | 2005-228288 | 8/2005 |

* cited by examiner

*Primary Examiner* — Glenn A Auve
*Assistant Examiner* — Nimesh G Patel
(74) *Attorney, Agent, or Firm* — Antonelli, Terry, Stout & Kraus, LLP.

(57) ABSTRACT

In a storage apparatus, an MPU acquires a value of power capable of being used to transition a HDD from a power-saving state to an access-enabled state, receives an access command via a host I/F, determines whether or not it is possible to respond to the access command using one or more HDD in the access-enabled state from among the HDD configuring a LU, and when it is determined that it is possible to respond, selects, from HDD in the power-saving state in the access command-targeted LU, one or more HDD, which are capable of transitioning to the access-enabled state using power in a range of usable power values, and which can make a response possible, as a target to be preferentially transitioned to the access-enabled state.

9 Claims, 10 Drawing Sheets

FIG. 3

POWER SPECIFICATION MANAGEMENT TABLE 251

| COMPONENT | RATED POWER | NORMAL POWER CONSUMPTION | POWER-SAVING POWER |
|---|---|---|---|
| SUBSYSTEM | 2000w | | |
| MAIN ENCLOSURE | 300w | | |
| EXPANSION ENCLOSURE | 200w | | |
| CTL | 100w | 50w | 25w |
| MPU | 30w | 25w | 10w |

FIG. 4

HDD SPECIFICATION MANAGEMENT TABLE 252

| VENDOR | MODEL NAME | SPIN-UP TIME | SPIN-UP POWER | IDLE POWER | I/O POWER | STANDBY POWER |
|---|---|---|---|---|---|---|
| A | A0001 | 20s | 35w | 12w | 18w | 2w |
| A | A0002 | 8s | 20w | 1w | 2.5w | 0.3w |
| B | B0001 | 20s | 32w | 13w | 20w | 3w |
| B | B0002 | 10s | 28w | 10w | 12w | 1.5w |
| C | C0001 | 23s | 30w | 11w | 16w | 2w |

FIG. 5

OPERATIONAL STATUS MANAGEMENT TABLE 265

| HDD NUMBER | MAXIMUM SPIN-UP TIME | SPIN-UP TIME | ... | LAST ACCESS TIME | MODEL NAME | DISPOSITION |
|---|---|---|---|---|---|---|
| 0 | 20s | 10.5s | ... | 08/04/01-12:00 | A0001 | MAIN ENCLOSURE |
| 1 | 14s | 12.5s | ... | 08/04/01-12:00 | A0001 | MAIN ENCLOSURE |
| 2 | 4.6s | 3.9s | ... | 08/04/01-11:30 | A0002 | MAIN ENCLOSURE |
| 3 | 6.1s | 4.8s | ... | 08/04/01-11:30 | A0002 | MAIN ENCLOSURE |
| 4 | 10.3s | 7s | ... | 08/03/31-23:00 | B0002 | EXPANSION ENCLOSURE |
| 5 | 28s | 15s | ... | 08/03/01-18:00 | C0001 | EXPANSION ENCLOSURE |

FIG. 6

POWER-SAVING CONFIGURATION MANAGEMENT TABLE 253

| HDD NUMBER | OPERATING STATE | POWER CONSUMPTION | SUSPEND TRANSITION TIME | RECOVERY TIME |
|---|---|---|---|---|
| 0 | STANDBY | 2w | 5min | 08/04/03-3:00 |
| 1 | STANDBY | 2w | 5min | 08/04/03-3:00 |
| 2 | STANDBY | 0.3w | 5min | 08/04/03-1:00 |
| 3 | STANDBY | 10w | 5min | 08/04/03-1:00 |
| 4 | STANDBY | 10w | 10min | 08/04/03-23:30 |
| 5 | I/O | 16w | 2min | — |

LU MANAGEMENT TABLE 254

| RAID GROUP 2541 | HDD 2542 | LU 2543 | OPERATING MODE 2544 |
|---|---|---|---|
| 0 | 0<br>1<br>2<br>3<br>4 | 1 | POWER SAVING |
| | | 2 | POWER SAVING |
| 2 | 5<br>6<br>7 | 3 | NORMAL |
| | | 4 | POWER SAVING |

STORAGE APPARATUS AND DISK DEVICE CONTROL METHOD

CROSS-REFERENCE TO PRIOR APPLICATION

This application relates to and claims the benefit of priority from Japanese Patent Application number 2008-161987, filed on Jun. 20, 2008 the entire disclosure of which is incorporated herein by reference.

BACKGROUND

Storage apparatuses that comprise a plurality of disk devices have been known for some time. In a storage apparatus, for example, a plurality of disk devices configures a logical unit, and a host computer or the like can access the logical unit. The problem is that if all the disk devices in a storage apparatus like this are designed so as to be access-enabled at all times, power consumption will be high.

Accordingly, technology for transitioning to a power-saving mode, for example, by spinning down the group of disk devices (stopping the disks) of a non-accessed logical unit when there has been no access from the host computer or the like for a prescribed period of time is known (Refer to Japanese Patent Laid-open No. 2000-293314).

Thus, when an access occurs while the group of disk devices is in the power-saving mode, for example, all of the disk devices of the group of disk devices are started up. In this case, a large amount of power can be needed to start up all the disk devices. In order to cope with this, either a high-capacity power source capable of supplying this power must be provided in the storage apparatus, or control for starting up the disk devices consecutively using the power capable of being supplied by the power source must be carried out.

Providing a high-capacity power source makes it possible to startup a large number of disk devices, but since the power used at startup is not required at times other than startup, the power source suffers from low utilization efficiency. Further, providing a high-capacity power source also leads to such problems as high storage apparatus manufacturing costs, and the need to secure a larger installation site. Meanwhile, carrying out control for consecutively starting up the disk devices raises the problem of not being able to respond to an access attempt from the host computer until all the disk devices have been started up, thereby lowering responsiveness and causing the host computer to time out.

Furthermore, technology for calculating and booting up the maximum number of devices capable of being booted up based on power supply capabilities is known as control for starting up a group of disk devices using the power that the power source is capable of supplying at times unrelated to host computer access (Refer to Japanese Patent Laid-open No. 2000-10678). Japanese Patent Laid-open No. 2000-10678 relates to booting up a device at times unrelated to an access attempt from the host computer, and does not give any consideration at all to responsiveness to a host computer access.

Meanwhile, as a technique for responding quickly to an access from the host computer while reducing power consumption, technology that sets the number of disk devices corresponding to the redundancy of a logical volume configured as a RAID (Redundant Array of Inexpensive Disks) group to the power-saving mode is known (Refer to Japanese Patent Laid-open No. 2005-228288).

SUMMARY

According to Japanese Patent Laid-open No. 2005-228288 technology, although access performance can be maintained by responding to an access using the redundancy resulting from the RAID (Redundant Array of Inexpensive Disks) group, the number of disk devices capable of being in a power-saving state is limited since only the disk devices that are able to utilize the redundancy are always access-enabled. For example, in the 3D+1P configuration of RAID 5, only one disk device is in the power-saving state. Therefore, the problem is that the effects of conserving power are not very high for the storage apparatus as a whole.

Accordingly, an object of the present invention is to provide technology that is capable of responding appropriately to an access request while maintaining the effect of power savings in the storage apparatus at a relatively high level.

To achieve the above-mentioned object, a storage apparatus according to an aspect of the present invention is a storage apparatus, which controls access to a logical unit that is configured from a plurality of disk devices, and which is also capable of controlling transition of a disk device to the power-saving state when a prescribed condition has been met, and has a power value acquisition unit that acquires the value of power that can be used for transitioning disk devices from the power-saving state to an access-enabled state; a receiving unit that receives an access command targeted at a prescribed storage area of a logical unit; a state determination unit that determines whether or not a response to an access command can be made via one or more disk devices that are in the access-enabled state of the plurality of disk devices configuring the logical unit; and, when the determination is that it is not possible to respond to the access command, a selection unit that selects, from the disk devices that are in the power-saving state among the plurality of disk devices that configure the access command-targeted logical unit, one or more disk devices, which are capable of transitioning to the access-enabled state using power in a range of usable power values, and which allow the response to the access command to be made.

BRIEF DESCRIPTION OF THE DRAWINGS

FIG. 3 is a diagram showing an example of a power specification management table according to an embodiment of the present invention;

FIG. 4 is a diagram showing an example of an HDD specification management table according to an embodiment of the present invention;

FIG. 5 is a diagram showing an example of an operational status management table according to an embodiment of the present invention;

FIG. 6 is a diagram showing an example of a power-saving configuration management table according to an embodiment of the present invention;

DESCRIPTION OF THE PREFERRED EMBODIMENTS

The embodiment of the present invention will be explained by referring to the figures. Furthermore, the embodiment explained hereinbelow does not limit the invention to the claims, and further, not all of the elements and combinations thereof explained in the embodiment are essential to the solution of the invention.

Figure 1:
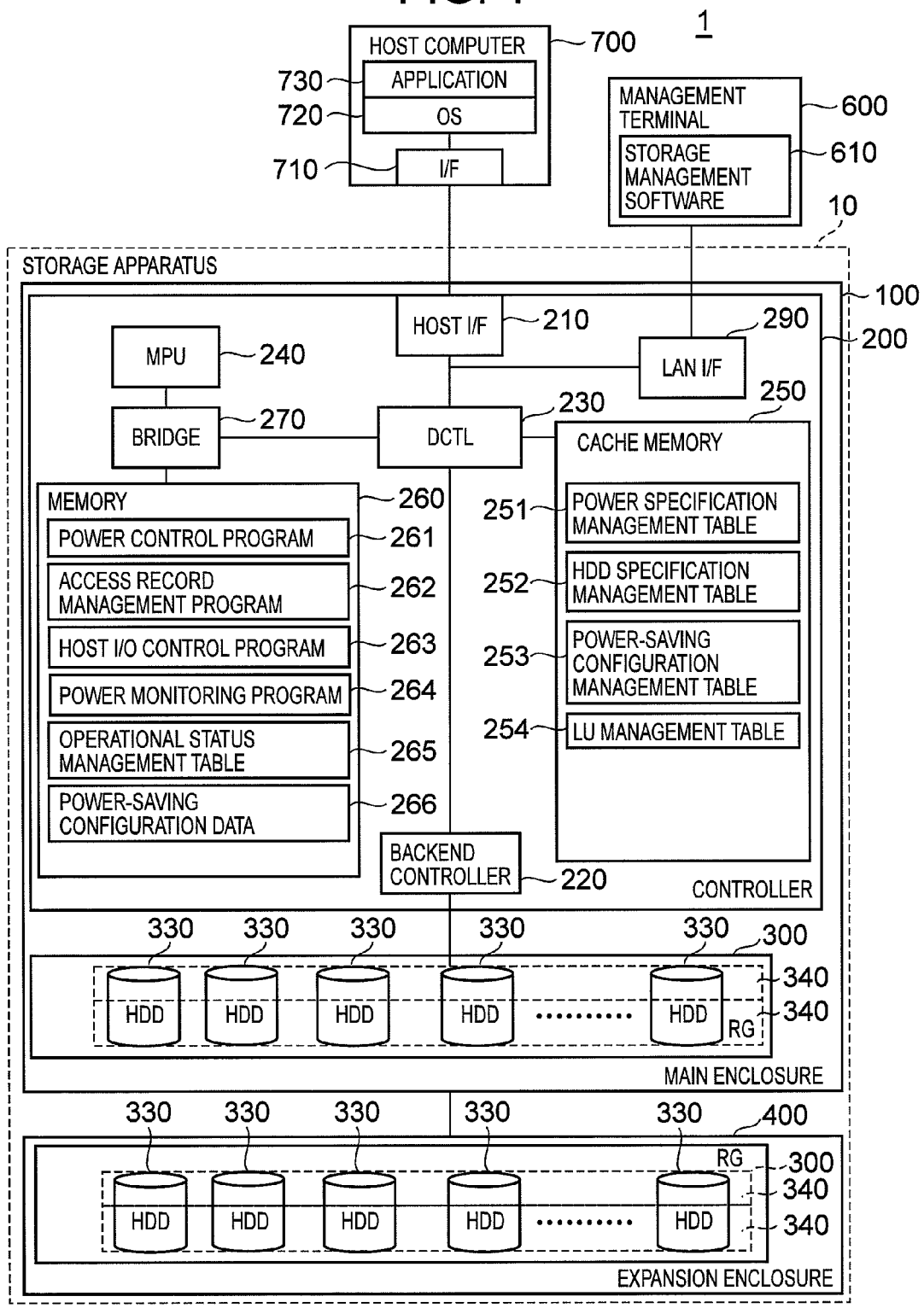
FIG. 1 is a functional configuration diagram of a computer system according to an embodiment of the present invention.

FIG. 1 is a functional configuration diagram of a computer system according to an embodiment of the present invention.

The computer system 1 has a host computer 700; a management terminal 600; and a storage apparatus 10. The host computer 700 has an OS (Operating System) 720; an application 730; and an I/F 710. A processor not shown in the figure of the host computer 700 executes a prescribed process by executing the OS 720 and application 730, and sends a data access command (including a command, such as a read command, write command, control command, or the like) to the storage apparatus 10 in accordance with the process. A read command sent from the host computer 700, for example, comprises the number (LUN: Logical Unit Number) of the logical unit (LU: Logical Unit) and a block address (LBA: Logical Block Address) of the logical unit in which the read-targeted data is managed. Further, a write command sent from the host computer 700, for example, comprises a LUN and LBA into which write-targeted data is written, and the write-targeted data. The I/F 710 carries out the mediation of the exchange of data between the host computer 700 and the storage apparatus 10. In this embodiment, the host computer 700 and storage apparatus 10 can be connected by any of a SAN (Storage Area Network), LAN (Local Area Network), the Internet, a leased line or a public line; it simply needs to be a network that is capable of carrying out data communications. Further, the network protocol can be the fiber channel protocol or the TCP/IP protocol; it simply needs to be a protocol that enables the exchange of data between the host computer 700 and the storage apparatus 10.

The management terminal 600 has storage management software 610, and executes a process that configures the storage apparatus 10 in accordance with various indications and configuration indications from the administrator (user) in accordance with a not-shown processor inside the management terminal 600 executing the storage management software 610. The management terminal 600 and the storage apparatus 10, for example, are connected by a LAN (Local Area Network).

The storage apparatus 10 has a main enclosure 100; and an expansion enclosure 400. The expansion enclosure 400 does not have to be provided, or a plurality of these enclosures 400 can be provided. The main enclosure 100 has a controller 200; and a plurality of disk devices (HDD) 330. In this embodiment, the main enclosure 100 comprises a RAID group 300, which configures a RAID (for example, RAID 1, 5, 6 and so forth) from a plurality of disk devices 330. Furthermore, a plurality of RAID groups 300 can also be provided. In the RAID group 300, one or more logical units (logical volumes) 340, which use at least one part of the storage area of the RAID group 300 as its own storage area, is created.

The controller 200 has a host interface (host I/F) 210; a backend controller 220; a data controller (DCTL) 230; a MPU (Micro Processing Unit) 240 as an example of a processor; a cache memory 250 as an example of an augmentation power value storage unit; a memory 260 as an example of a history storage unit; a bridge 270; and a LAN I/F 290.

The host I/F 210 mediates the exchange of data with the host computer 700. The backend controller 220 controls the exchange of data between the controller 200 and the plurality of HDD 330 provided in the main enclosure 100 and expansion enclosure 400. The data controller 230 is connected to the host I/F 210, backend controller 220, cache memory 250, bridge 270, and LAN I/F 290, and controls the flow of data among the respective units. The bridge 270 is connected to the DTCL 230, MPU 240, and memory 260, and relays data between the respective units. The LAN I/F 290 carries out meditation of the exchange of data between the host computer 700 and the storage apparatus 10.

The MPU 240 executes various types of processing using the programs and data stored in the cache memory 250 and memory 260. Here, the MPU 240 executes various programs in the memory 260 to configure the power value acquisition unit, receiving unit, status determination unit, selection unit, a first migration controller, a second migration controller, a response execution unit, a reflection unit, and a measurement unit. The memory 260 stores programs and data. In this embodiment, the memory 260 stores a power control program 261; an access record management program 262; a host I/O control program 263; a power monitoring program 264; an operational status management table 265; and power-saving configuration data 266.

The power control program 261 allows the MPU 240 to execute a process for controlling the operation of the plurality of HDD 330. The access record management program 262 allows the MPU 240 to execute a process for recording host computer 700 access information. The host I/O control program 263 allows the MPU 240 to execute processes for writing/reading to/from the HDD 330 in accordance with a command, such as a read command or write command from the host device. The power monitoring program 264 allows the MPU 240 to execute a process for collecting information on the working power of the respective units of the storage apparatus 10.

The cache memory 250 stores various types of data. In this embodiment, the cache memory 250 stores a power specification management table 251; an HDD specification management table 252; a power-saving configuration management table 253; and a LU management table 254. At least one of the respective tables 251 through 254 here can be stored in the memory 260. Furthermore, the configurations of the respective tables 251 through 254 will be explained further below.

The expansion enclosure 400 has a plurality of HDD 330. In this embodiment, the expansion enclosure 400 comprises a RAID group 300 that is configured from RAID (for example, RAID 1, 5, 6 and so forth) that use pluralities of HDD 330. Furthermore, a plurality of RAID groups 300 can also be provided. One or more logical units (logical volumes) 340 that use at least a part of the storage area of the RAID group 300 as its own storage area is disposed in the RAID group 300.

Next, the monitoring of the power supply and power status of the computer system 1 will be explained.

Figure 2:
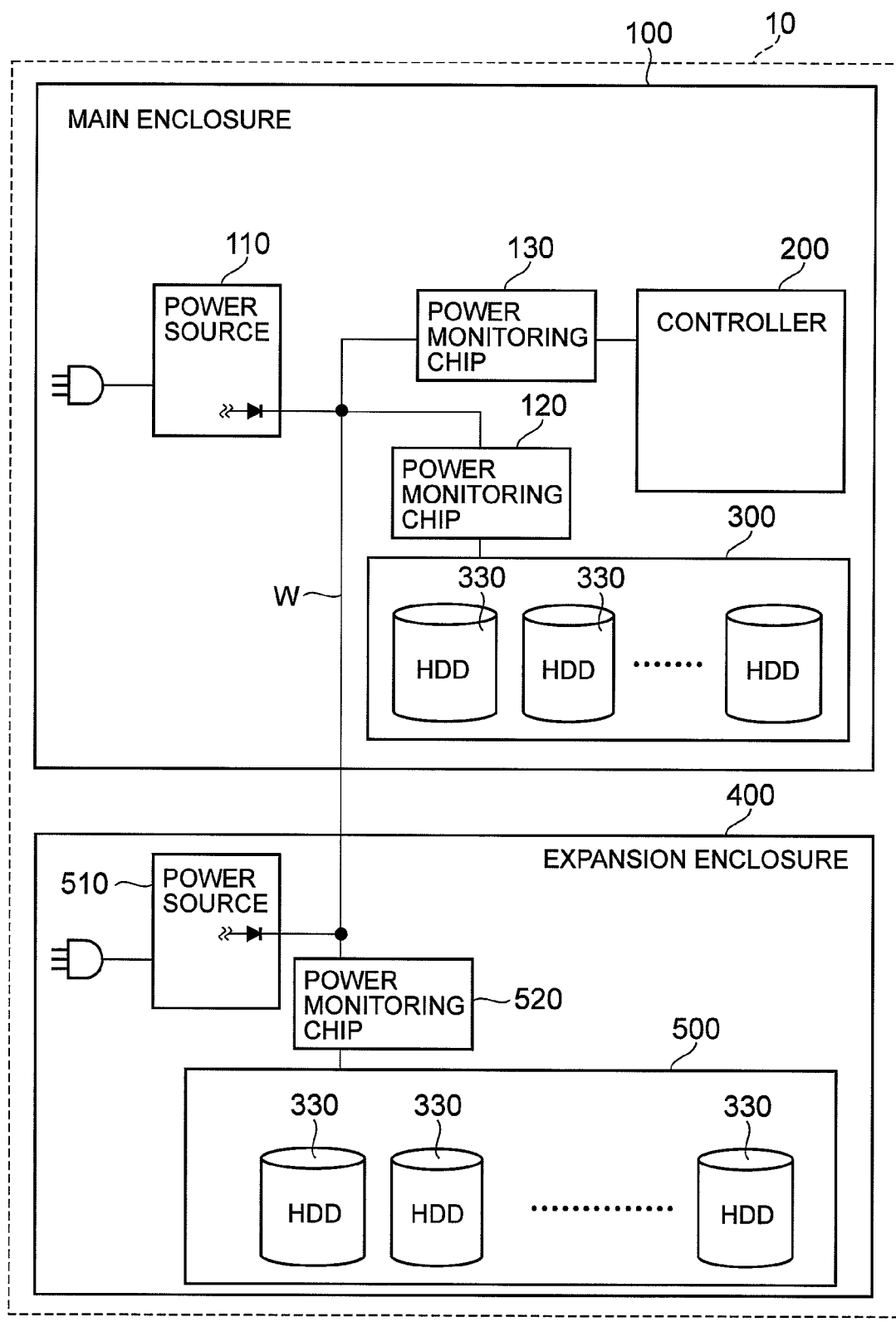
FIG. 2 is a partial configuration diagram related to the power supply of the computer system according to an embodiment of the present invention.

FIG. 2 is a partial configuration diagram related to the power supply of the computer system according to the embodiment of the present invention.

A power source 110 that supplies power to the inside of the main enclosure 100 is disposed in the main enclosure 100. The power source 110 is connected to the plurality of HDD 330 and the controller 200 via wires W for supplying the power. Power monitoring chips 120, 130 are disposed in the wires W for monitoring the power respectively supplied between the power source 110 and the plurality of HDD 330, and between the power source 110 and the controller 200. The monitoring chips 120, 130 notify the MPU 240 that executes the power monitoring program 264 of the results of this monitoring (for example, the power values).

Further, a power source 510 that supplies power to the inside of the expansion enclosure 400 is disposed in the expansion enclosure 400. The power source 510 is connected via a wire W to the plurality of HDD 330 inside the expansion enclosure 400. A power monitoring chip 520 is disposed in the wire W for monitoring the power supplied to the plurality of HDD 330 between the power source 510 and the plurality of HDD 330. The monitoring chip 520 notifies the MPU 240 that executes the power monitoring program 264 of the results of monitoring (for example, the power values). Furthermore, although not shown in this figure, power monitoring chips that monitor the power consumption of components other than the main enclosure 100 and the expansion enclosure 400 are also provided, and the monitoring results from these power monitoring chips are also notified to the MPU 240.

Next, the tables and data stored in the cache memory 250 and the memory 260 will be explained.

FIG. 3 is a diagram showing an example of a power specification management table according to the embodiment of the present invention.

The power specification management table 251 stores records having a component field 2511; rated power field 2512; normal power consumption field 2513; and power-saving power field 2514. The component field 2511 stores the names of the components of the storage apparatus 10. The components, for example, include a subsystem (storage apparatus) 10, the main enclosure 100, expansion enclosure 400, controller 200, and MPU 240. The rated power field 2512 stores the rated power values of the corresponding components. The normal power consumption field 2513 stores the power consumption values at normal times (normal power consumption values) of the corresponding components. Furthermore, normal power consumption values are not stored for the subsystem 10, main enclosure 100, and expansion enclosure 400 since such values will fluctuate in accordance with the configuration and so forth. The power-saving power field 2514 stores power consumption values at power saving times (power-saving power consumption values).

The respective values in the power specification management table 251, for example, can be configured and changed by the user inputting values via the management terminal 600. Furthermore, the values corresponding to the components can be stored beforehand in the memory inside a component or another storage device, collected from these memories and storage devices by the MPU 240, and automatically configured in the power specification management table 251.

FIG. 4 is a diagram showing an example of an HDD specification management table according to the embodiment of the present invention.

The HDD specification management table 252 stores records having a vendor field 2521; a model name field 2522; a spin-up time field 2523; a spin-up power field 2524; an idle power field 2525; an I/O power field 2526; and a standby power field 2527.

The name of the vendor of the HDD 330 is stored in the vendor field 2521. The name of the model of HDD 330 is stored in the model name field 2522. The time required to spin up the corresponding HDD 330, that is, the time required to reach a specified speed after starting to rotate the disks of the HDD 330 is stored in the spin-up time field 2523. The value of the power needed at spin-up is stored in the spin-up power field 2524. The value of the power needed in the idle state that is, a state in which it is possible to respond immediately to an I/O (an example of an access-enabled state), is stored in the idle power field 2525. The value of the power needed in a state in which either an input (write) or output (read) is carried out (I/O state: an example of an access-enabled state) is stored in the I/O power field 2526. The value of the power needed by the HDD 330 in the standby state, in which the rotation of the disks has been stopped and the HDD 330 is waiting for a rotate disk indication (an example of a power-saving state), is stored in the standby power field 2527. Furthermore, the HDD specification management table 252 does not store the value of the power added when spinning up from the standby state per se, but does store the power value of the standby state and the power value needed at spin-up, so that the power value added when spinning up from the standby state is substantially stored in the HDD specification management table 252.

For example, the topmost record of the HDD specification management table 252 shows that HDD 330 model "A0001" from vendor "A" has a spin-up time of 20 s (seconds), spin-up power of 35 w, idle power of 12 w, I/O power of 18 w, and standby power of 2 w.

The respective values in the HDD specification management table 252, for example, can be configured and changed by the user carrying out inputting via the management terminal 600. Furthermore, values corresponding to the respective fields can be stored beforehand in a storage device inside an HDD 330, and the MPU 240 can automatically collect these values therefrom, and configure these values in the HDD specifications management table 252.

FIG. 5 is a diagram showing an example of operational status management table according to the embodiment of the present invention.

The operational status management table 265 stores records having a HDD number field 2651; a maximum spin-up time field 2652; a plurality of spin-up times field 2653; a last access time field 2654; a model name field 2655; and a disposition field 2656.

A HDD number that uniquely identifies an HDD 330 inside the storage apparatus 10 is stored in the HDD number field 2651. The maximum length of time actually required to spin up the corresponding HDD 330 (maximum spin-up time) is stored in the maximum spin-up time field 2652. The actual spin-up times of the corresponding HDD 330 are stored in the spin-up times field 2653. Since there is a plurality of spin-up times field 2653 in this embodiment, the history of a plurality of spin-up times can be managed. The last time that the corresponding HDD 330 was accessed (last access time) is stored in the last access time field 2654. The model name of the corresponding HDD 330 is stored in the model name field 2655. The name of the enclosure in which the corresponding HDD 330 is disposed is stored in the disposition field 2656.

For example, the HDD number, model name, and disposition can be configured and changed by the user carrying out inputting via the management terminal 600 to the operational status management table 265. Meanwhile, the MPU 240 executing the access record management program 262 determines and stores the last access time by monitoring accesses to the HDD 330. The MPU 240 executing the power control program 261 determines and stores the maximum spin-up time and spin-up times by monitoring the HDD 330 spin-ups.

FIG. 6 is a diagram showing an example of a power-saving configuration management table according to the embodiment of the present invention.

The power-saving configuration management table 253 stores records having a HDD number field 2531; an operating state field 2532; a power consumption field 2533; a suspend transition time field 2534; and a recovery time field 2535.

An HDD number is stored in the HDD number field 2531. The operating state of the corresponding HDD 330 is stored in the operating state field 2532. Operating states include the standby state (an example of a power-saving state), the idle state, and the I/O state. Further, the standby state can be configured to change in stages, such as unloading the head, reducing the disk speed and suspending the disk rotation. The value of the power consumed by the corresponding HDD 330 is stored in the power consumption field 2533. When there is no access, the time until the HDD 330 transitions to the power-saving state (suspend transition time) is stored in the suspend transition time field 2534. The time it takes the HDD 330 to recover from the power-saving state is stored in the recovery time field 2535.

For example, the HDD number, suspend transition time, and recovery time, for example, can be configured and changed by the user carrying out inputting via the management terminal 600 to the power-saving configuration management table 253. Meanwhile, the MPU 240 executes the power control program 261 to store the operating state of the HDD 330, and the MPU 240 executes the power monitoring program 264 to determine and store the power consumption of the HDD 330.

Figures 7, 8:
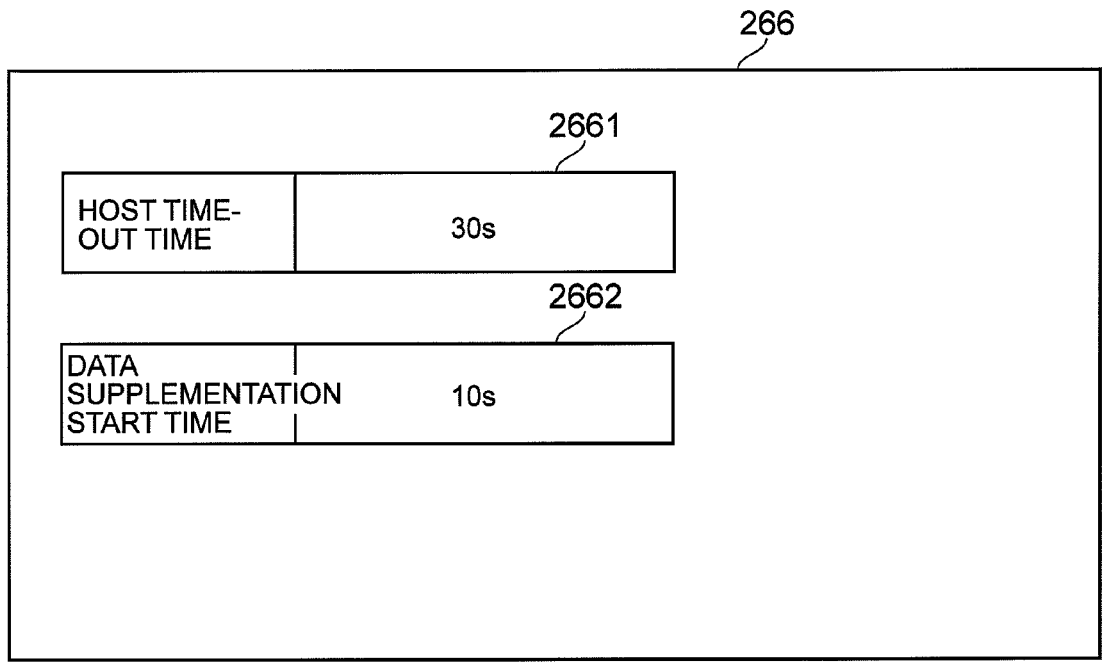
FIG. 7 is a diagram showing an example of power-saving configuration data according to an embodiment of the present invention.
FIG. 8 is a diagram showing an example of a LU management table according to an embodiment of the present invention.

FIG. 7 is a diagram showing an example of power-saving configuration data according to the embodiment of the present invention.

Power-saving configuration data 266 includes a host time-out time 2661; and a data supplementation start time 2662. The host time-out time 2661 is the time from when the host computer 700 makes a host request until time-out (discontinuation of processing) occurs. The data supplementation start time 2662 is the time that supplementation is to be started when responding to a read request from the host computer 700 by using redundancy to supplement data in order to avoid a time-out. The host time-out time and data supplementation start time, for example, can be configured and changed by the user carrying out inputting via the management terminal 600.

FIG. 8 is a diagram showing an example of a LU management table according to the embodiment of the present invention.

The LU management table 254 correspondently stores data in a RAID group field 2541, HDD field 2542, LU field 2543, and operating mode field 2544. RAID group numbers identifying RAID groups are stored in the RAID group field 2541. The HDD numbers of the plurality of HDD 330 configuring the corresponding RAID group are stored in the HDD field 2542. The number (LUN) of the LU (logical unit) created in the corresponding RAID group is stored in the LU field 2543. A mode configuration, which shows either a power-saving mode that transitions the HDDs of the corresponding LU to the power-saving state when the corresponding LU meets a prescribed condition, or a normal mode, in which the HDDs of the corresponding LU remains in the normal state without being transitioned to the power-saving state. In this embodiment, when all of the LU belonging to the same RAID group are configured to the power-saving mode, the HDD 330 of this RAID group are controlled as the power-saving mode by the processing of the MPU 240, which executes the power control program 261, and when even one of the LU belonging to the same RAID group is configured to the normal mode, the HDD 330 are not controlled as the power-saving mode.

According to this LU management table 254, for example, it is clear that logical unit LUN "1" is created in RAID group "0", that this RAID group is configured from HDD 330 "0" through 4", and is in the power-saving mode. The RAID group, HDD number, LUN and operating mode of the LU management table 254, for example, can be configured and changed by the user carrying out inputting via the management terminal 600.

Next, a processing operation by the computer system according to the embodiment of the present invention will be explained.

Figure 9:
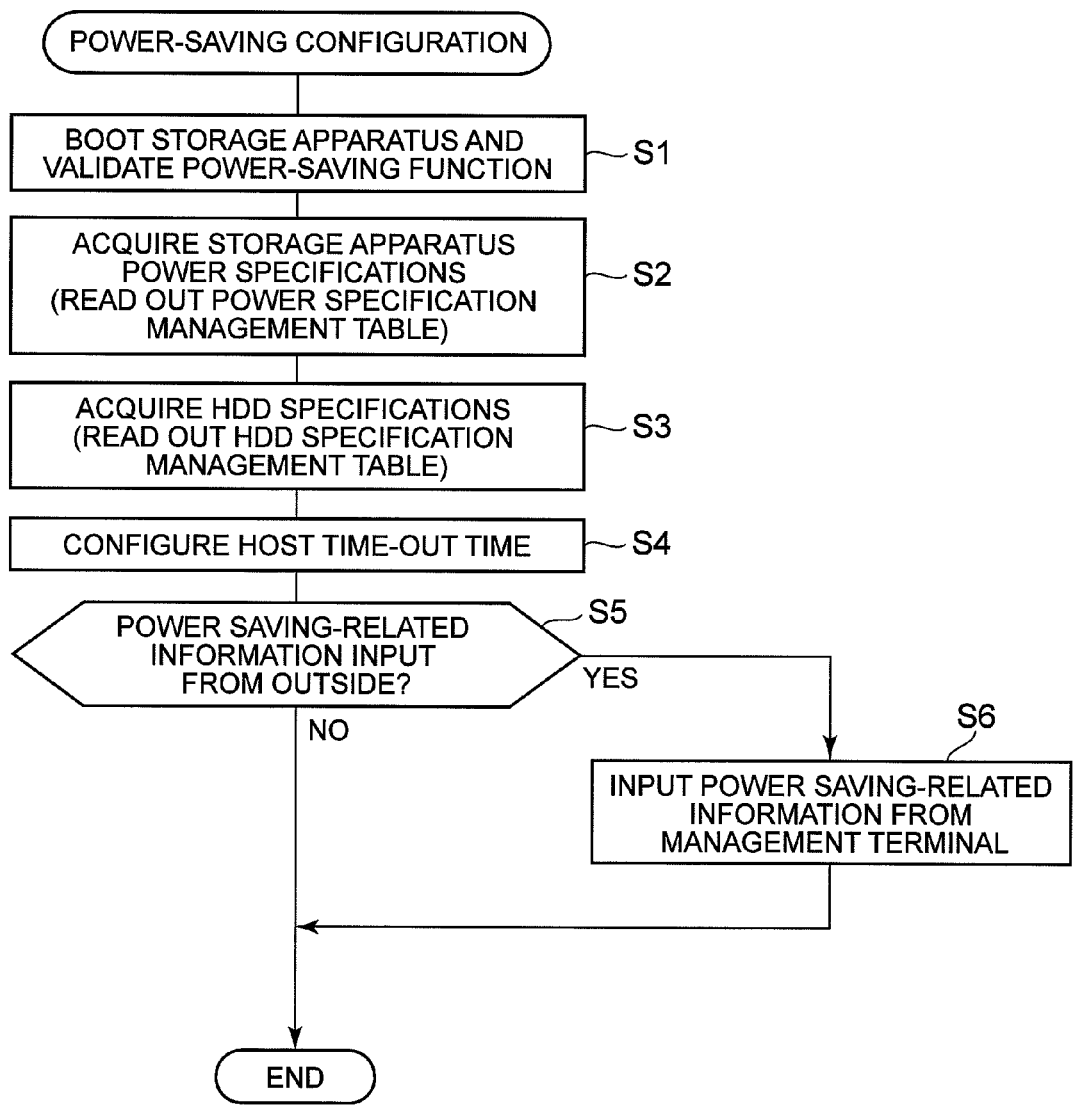
FIG. 9 is a flowchart of a power-saving configuration process according to an embodiment of the present invention.

FIG. 9 is a flowchart of a power-saving configuration process according to the embodiment of the present invention. This power-saving configuration process, for example, is executed subsequent to turning ON the power to the storage apparatus 10.

In the power-saving configuration process, the MPU 240 executes the power control program 261, boots up the storage apparatus 10, and validates the power-saving function (Step S1). That is, for a RAID group in which all the LU belonging to the same RAID group have been configured to the power-saving mode, the MPU 240 sets the HDD 330 configuring this RAID group to the power-saving state, and boots up HDD 330 configuring the other RAID groups as the normal state.

Next, the MPU 240 reads out the power specification management table 251 from a prescribed storage destination (for example, the HDD 330 of a prescribed RAID group inside the storage apparatus 10) to the cache memory 250 (Step S2), reads out the HDD specification management table 252 from a prescribed storage destination (for example, the HDD 330 of a prescribed RAID group inside the storage apparatus 10) to the cache memory 250 (Step S3), and reads out the host time-out time and data supplementation start time from a prescribed storage destination (for example, the HDD 330 of a prescribed RAID group inside the storage apparatus 10) to the memory 260 (Step S4).

Next, the MPU 240 determines whether or not there is an external input request of power saving-related information, such as a new HDD specification or a LU operating mode configuration (Step S5), and when there is no external input request, ends processing. Conversely, when there is an external input request, the MPU 240 receives the power saving-related information input from the management terminal 600, adds this information to the corresponding table (Step S6), and ends processing.

Figure 10:
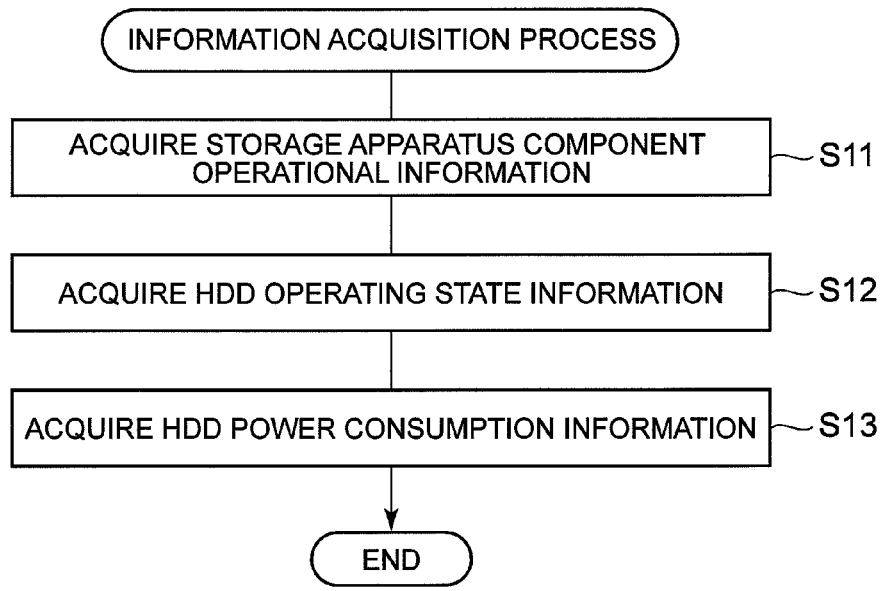
FIG. 10 is a flowchart of an information acquisition process according to an embodiment of the present invention.

FIG. 10 is a flowchart of an information acquisition process according to the embodiment of the present invention.

The information acquisition process, for example, is executed repeatedly at prescribed time intervals. In the information acquisition process, the MPU 240 executes the power monitoring program 264 to acquire the power consumption of the respective components of the storage apparatus 10 (for example, the controller 200) from the power monitoring chip 130, and stores this information in the memory 260 (Step S11). Next, the MPU 240 executes the power control program 261 to acquire the operating state of the HDD 330, stores this information in the power-saving configuration management table 253 (Step S12), and also acquires the power consumption of the respective HDD 330 from the power monitoring chips 120 and 520, and stores this information in the power-saving configuration management table 253 (Step S13).

Figure 11:
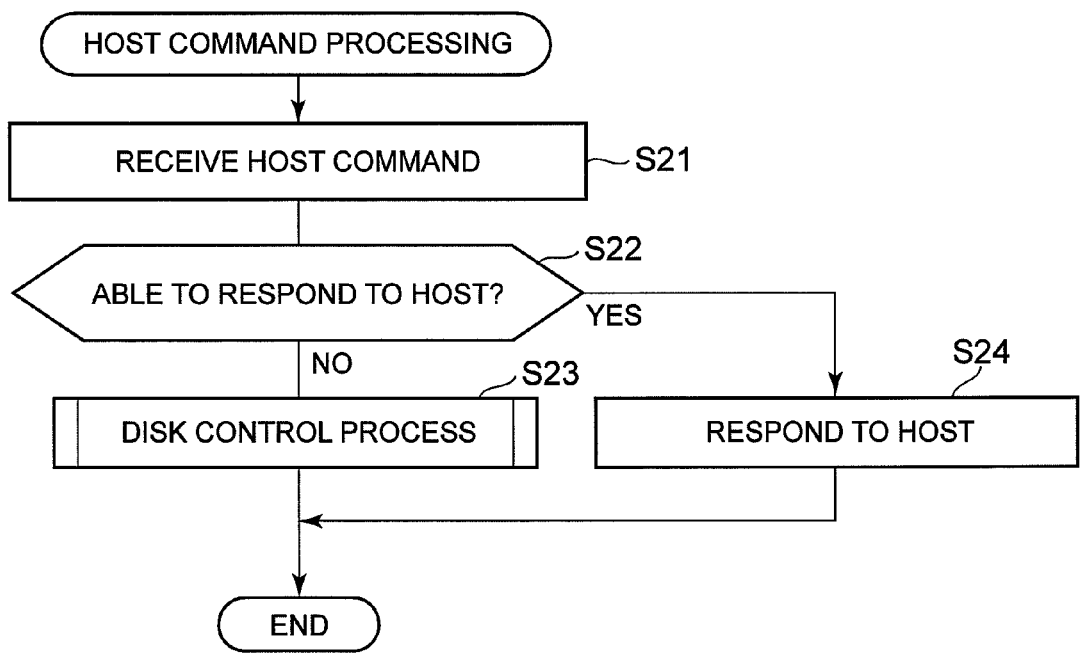
FIG. 11 is a flowchart of a host command process according to an embodiment of the present invention.

FIG. 11 is a flowchart of a host command process according to the embodiment of the present invention.

The host command process, for example, is executed repeatedly at prescribed time intervals. In the host command process, first the MPU 240 executing the host I/O control program 263 receives a host command (either a read command or a write command) sent from the host computer 700 (Step S21), and determines whether or not a response to the host command can be issued immediately (Step S22).

In this embodiment, first the MPU 240 uses the LU management table 254 to specify all the HDD 330 of the RAID group in which the LU (target LU) corresponding to the LUN comprised in the host command has been created, and uses the operating state field 2532 of the power-saving configuration management table 253 to discern the operating state of the specified HDD 330. Then, when all of the specified HDD 330 constitute access-enabled states (states other than the power-saving state, for example, the idle state or I/O state), the MPU 240 determines that a response is possible. Further, when the number of HDD 330 capable of responding by using redundancy (for example, three HDD when there are four HDD configuring a RAID5) are in an access-enabled state in the RAID group in which the target LU has been created, the MPU 240 also makes the determination that a response is possible. Further, the MPU 240 also determines that a response is possible when all of the HDD 330, which store all of the data corresponding to the LUN and LBA comprised in the host command, are in access-enabled states. More specifically, this is equivalent to a situation in which the areas corresponding to the LUN and LBA denoted by the access command are stored in a single HDD 330, and this HDD 330 constitutes an access-enabled state. Furthermore, the corresponding relationship between the LBA in the LUN and the HDD 330 in which the LBA is stored is managed by a table not shown in the figure.

As a result, when the determination is that a response to the host is possible, the MPU 240 carries out a response to the host (Step S24). For example, when the host command is a read command and the number of HDD 330 capable of responding by using redundancy are in access-enabled states, the MPU 240 reads out as-is from among the read-targeted data the data to be read out from the access-enabled HDD 330, and uses redundancy to supplement data from among the read-targeted data that is not stored in the access-enabled HDD 330. For example, if these HDD 330 constitute a RAID5-configured RAID group, the MPU 240 creates data not comprised in the access-enabled HDD 330 (data comprised in power-saving state HDD 330) from parity data and data, which is used when creating the parity data, and which is to be read out from the access-enabled HDD 330. Then, the MPU 240 sends the read-out data and the supplemented data to the host computer 700 as a host response.

Conversely, when the determination is that a host response is not possible (Step S22: NO), the MPU 240 executes a disk control process (Step S23).

Figure 12:
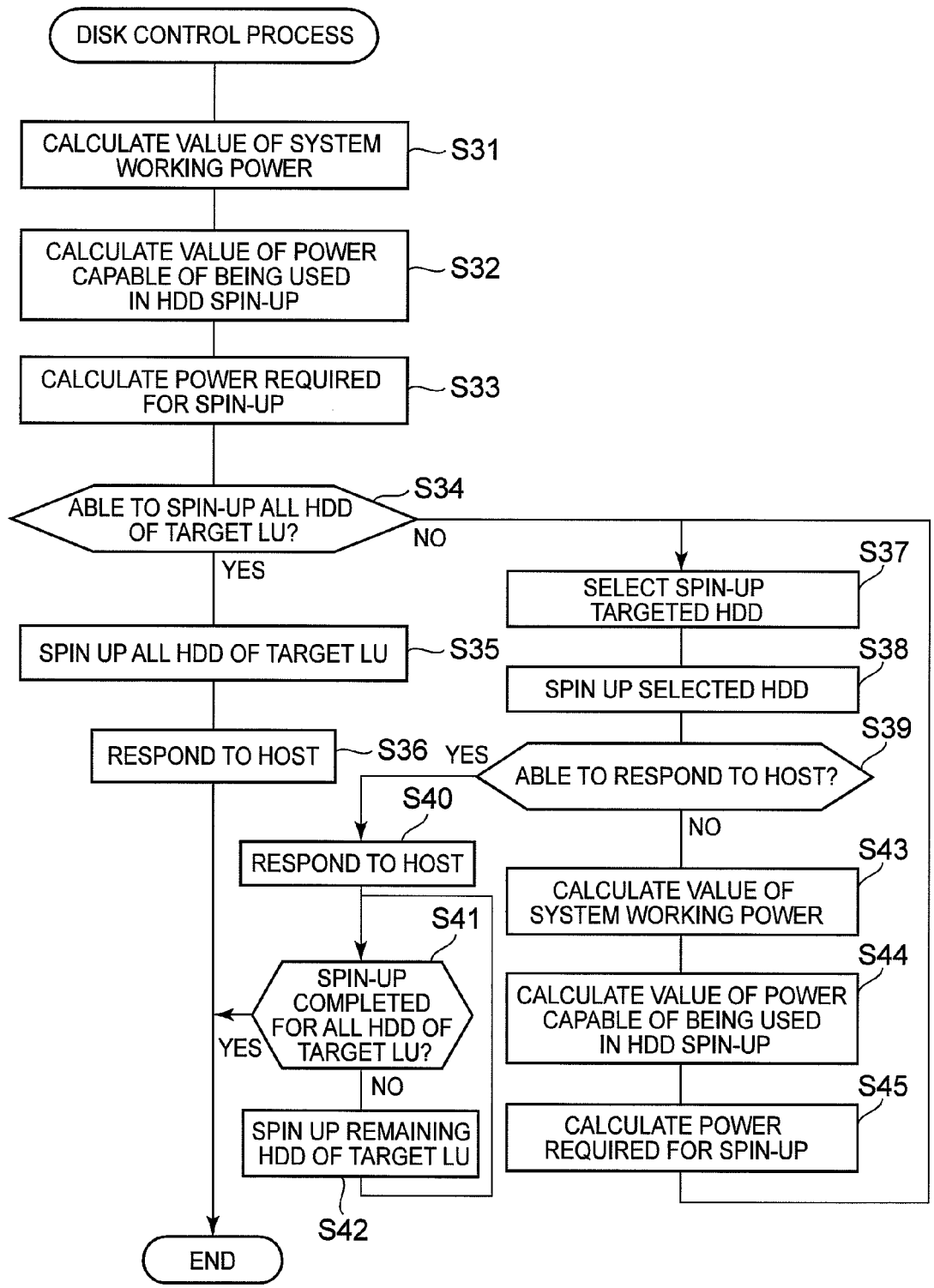
FIG. 12 is a flowchart of a disk control process according to an embodiment of the present invention.

FIG. 12 is a flowchart of a disk control process according to the embodiment of the present invention.

In the disk control process, the MPU 240 calculates the power value being used in the main enclosure 100 of the storage apparatus 10, and the power value being used in the expansion enclosure 400 (Step S31). In this embodiment, the MPU 240 can calculate the power value being used in the main enclosure 100 by adding the working power values of the components (the controller 200 and so forth) of the main enclosure 100 stored in the memory 260 and the power consumption (acquired from the power-saving configuration management table 266) of all the HDD 330 arranged in the main enclosure 100, and can calculate the power value being used in the expansion enclosure 400 by adding the power values of the components of the expansion enclosure 400 stored in the memory 260 and the power consumption (acquired from the power-saving configuration management table 266) of all the HDD 330 arranged in the expansion enclosure 400.

Next, the MPU 240 calculates the values of the power capable of being used to spin-up the HDD 330 in the respective main enclosure 100 and expansion enclosure 400 (Step S32). That is, the MPU 240 calculates the usable power value for the main enclosure 100 by subtracting the working power value being used in the main enclosure 100 from the rated power value of the main enclosure 100 in the power specification management table 251, and calculates the usable power value for the expansion enclosure 400 by subtracting the working power value being used in the expansion enclosure 400 from the rated power value of the expansion enclosure 400 in the power specification management table 251.

Next, the MPU 240 calculates the power value that is required to spin up all the HDD 330 of the LU (target LU) denoted by the host command (Step S33). In this embodiment, the MPU 240 uses the operational status management table 265 to specify the model names and dispositions of all the HDD 330 for which the target LU are in the power-saving state, uses the HDD specification management table 252 to calculate the power value of the difference between the spin-up power of the specified models of HDD 330 and the standby power, that is, the power value that is added when spin-up is carried out, respectively divides up between the main enclosure 100 and the expansion enclosure 400 the power values of the differences of all the HDD 330 for which the target LU are in the power-saving state in accordance with the dispositions of these HDD 330, and finds the power value required at spin-up in the main enclosure 100 and the power value required at spin-up in the expansion enclosure 400 by totaling the power values for each of these enclosures.

Next, the MPU 240 determines whether or not it is possible to spin up all the HDD 330 of the LU (target LU) denoted by the host command, that is, whether or not spinning up all the HDD 330 in the power-saving state can be done within the usable power values for each of the main enclosure 100 and expansion enclosure 400 (Step S34). That is, the MPU 240 determines whether or not the already calculated power value required at spin-up in the main enclosure 100 and the power value required at spin-up in the expansion enclosure 400 are less than the usable power values of the respective enclosures.

As a result, when it is possible to spin up all the HDD 330 of the target LU, that is, when the power value required at spin-up is less than the usable power quantity (Step S34: YES), the MPU 240 commences the spin-up of all the HDD 330 that constitute the power-saving state from among the HDD 330 configuring the target LU, and after all spin-ups have ended, executes an access (either a read or write) process for the target LU, and issues a response to the host computer 700 (Step S36).

Conversely, when it is not possible to spin up all the HDD 330 of the target LU (Step S34: NO), the MPU 240 preferentially selects as the spin-up target, from among all the HDD 330 in the power-saving state within the target LU, one or more HDD 330, which can be spun up within the usable power values of the main enclosure 100 and expansion enclosure 400, which can respond to the access command, and, in addition, which have spin-up times that are less than the time-out times (Step S37). Furthermore, the condition that the spin-up time be less than the time-out time need not be used in all cases. Furthermore, when an HDD, which is capable of spinning up within the limits of the usable power value, is not capable of an access command response, the MPU 240 spins up the HDD capable of spinning up within the limits of the usable power value, and thereafter, spins up another HDD required for issuing an access command response. In this embodiment, for example, when the storage area of the data targeted by the host command (read/write command) is limited to a portion of the HDD 330, the HDD 330, which are capable of access command response, are this portion of the HDD 330. Further, for example, when the RAID group that stores the target LU is RAID1, the HDD 330, which is capable of access command response, is the one or more HDD 330 that store one side of the same data. Further, when the RAID group that stores the target LU is either RAID5 or RAID6, the HDD 330, which is capable of access command response, is the plurality of HDD that is able to supplement the data, and, for example, in the case of RAID5, is all of the plurality of HDD except one, and in the case of RAID6, is all of the plurality of HDD except two.

When there is a plurality of one or more HDD 330 candidates, which can be spun up within the usable power values of the main enclosure 100 and expansion enclosure 400, which is capable of an access command response, and, in addition, which has spin-up times that are less than the time-out times, for example, an HDD candidate having the shortest spin-up time can be preferentially selected. As the spin-up time used to select the HDD 330 here, the spin-up time in the spin-up time field 2523 of the HDD specification management table 252, an average spin-up time of the plurality of actually required spin-up times in the operational status management table 265, or the maximum spin-up time in the operational status management table 265 can be used. Further, when there is a plurality of one or more HDD 330 candidates, preferential selection may be made for the HDD 330 candidate that finishes processing the host command in the shortest period of time based on the HDD 330 data transfer rate. By so doing, the completion of a host access can be done in a short period of time. Further, when there is a plurality of one or more HDD 330 candidates, preferential selection may be made for the HDD candidate that has the lowest spin-up power in the HDD specification management table 252. In so doing, it is possible to curb power at spin-up, allowing, for example, the power saved thereby to be utilized for power when spinning up in response to another host access.

Next, the MPU 240 commences spinning up the selected HDD 330, and after spin-up has ended (Step S38), determines whether or not it is possible to respond to the host command immediately (Step S39). The specific processing of Step S39 is the same as that of Step S22.

When the result of this determination is that an immediate host response is possible (Step S39: YES), the MPU 240 carries out a host response (Step S40). The specific processing of Step S40 is the same as that of Step S24. Next, the MPU 240 determines whether or not all the HDD 330 of the target LU have finished spinning up (Step S41), and when spin up has not ended, spins up the remaining target-LU HDD 330 that are in the power-saving state (Step S42). Furthermore, in this process, the maximum number of HDD 330 in both the main enclosure 100 and the expansion enclosure 400 are spun up within the ranges of the usable power.

Conversely, when all the HDD 330 of the target LU have been spun up (Step S41), the MPU 240 executes the required processing, and, for example, when the host command is a write command, the MPU 240 executes a process that stores the data to be reflected and the parity data in the spun-up HDD 330 subsequent to responding to the host, and ends the disk control process.

Meanwhile, when the determination in Step S39 is that an immediate host response is not possible (Step S39: NO), the MPU 240 calculates the power value being used in the main enclosure 100 and the power value being used in the expansion enclosure 400 using the same processing as that of Step S31 (Step S43), calculates the power value capable of being used to spin up HDD 330 in both the main enclosure 100 and the expansion enclosure 400 using the same processing as that of Step S32 (Step S44), calculates the power value required to spin up all the target-LU HDD 330 in the power-saving state that have not been spun up (Step S45), and executes processing from the above-described Step S37.

Next, a specific example of selecting a spin-up-targeted HDD 330 in Step S37 will be explained.

FIGS. 13 through 16 are diagrams illustrating the selection of a spin-up-targeted HDD according to the embodiment of the present invention.

Figure 13:
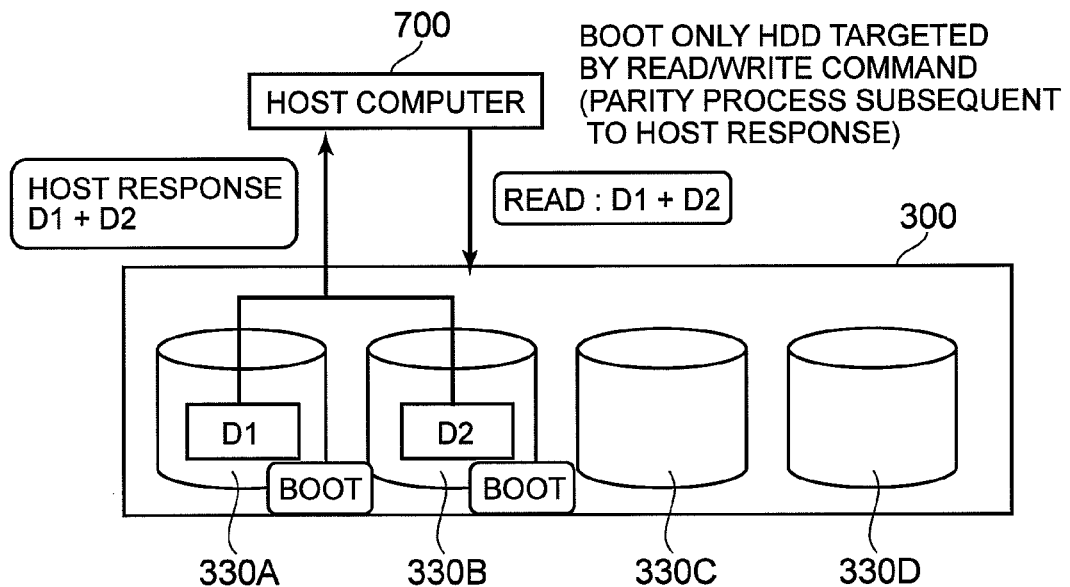
FIG. 13 is a first diagram illustrating the selection of a spin-up targeted HDD according to an embodiment of the present invention.

As shown in FIG. 13, when the storage area for the data D1, D2 targeted by the read/write command sent from the host computer 700 is limited to a portion of the HDD 330 (330A, 330B) of the RAID group, in Step S37 the MPU 240 selects HDD 330A and 330B as the HDD 330 targeted for spin-up if the power in the respective enclosures (main enclosure 100, expansion enclosure 400) to be added as a result of the spin-up of HDD 330A and 330B is less than the usable power values of the respective enclosures, and the spin-up times of HDD 330A and HDD 330B are less than the host time-out times. Furthermore, the MPU 240 can use the LUN and LBA in the host command and the tables stored in the cache memory 250 to specify the HDD 330 that will constitute the storage area for the data D1, D2 targeted by the read/write command.

As a result, after HDD 330A and 330B have been spun up, data D1 access is carried out to HDD 330A, data D2 access is carried out to HDD 330B, and a response is sent to the host computer 700. Consequently, spinning up the portion of the RAID group (only HDD 330A and 330B) makes it possible to respond to the host computer 700 within the usable power value and without causing a host time-out. Furthermore, when the host command is a write command and the RAID group 300 is configured as either RAID5 or RAID6, after spinning up the portion of the RAID group (only the HDD 330A and 330B), the MPU 240 spins up HDD 330C and HDD 330D, and stores parity data corresponding to the changed data D1 and D2 in either HDD 330C or 330D.

Figure 14:
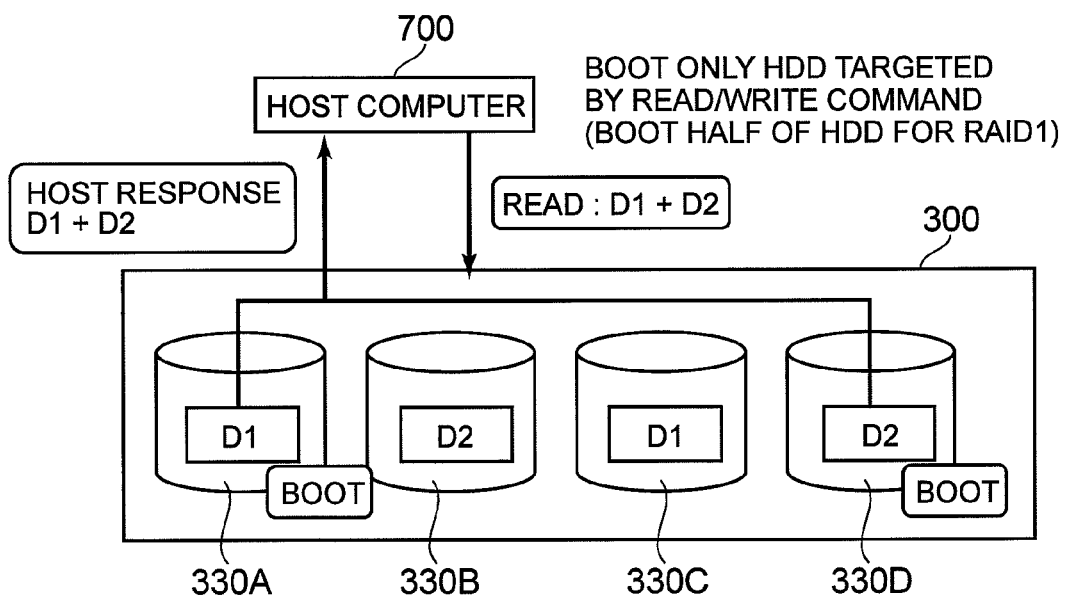
FIG. 14 is a second diagram illustrating the selection of a spin-up targeted HDD according to an embodiment of the present invention.

Further, as shown in FIG. 14, when the RAID group 300 is configured as RAID1 (mirroring), by spinning up the HDD 330 (for example, HDD 330A and HDD 330D) of the one side of the HDD 330 that store the same data (in this example, HDD 330A and HDD 330D, and HDD 330B and HDD 330C) in Step S37, the MPU 240 selects the HDD 330A and 330D as the HDD 330 targeted for spin-up if the power in the respective enclosures (main enclosure 100, expansion enclosure 400) is less than the usable power values of the respective enclosures, and the spin-up times of HDD 330A and HDD 330D are less than the host time-out times. The selectable HDD are not limited to these HDD, but rather the MPU 240 carries out selection by comparing the respective HDD transition times from the power-saving state to the normal state (the spin-up times) and the power required for transitioning from the power-saving state to the normal state (spin-up power), the response time-out time, and the usable power of the respective enclosures.

As a result, after HDD 330A and 330D have been spun up, data D1 access is carried out to HDD 330A, data D2 access is carried out to HDD 330D, and a response is sent to the host computer 700. Consequently, starting up only one half of the HDD 330 of the RAID group makes it possible to respond to the host computer 700 within the usable power value and without causing a host time-out. Furthermore, when the host command is a write command, thereafter the MPU 240 spins up HDD 330B and HDD 330C, stores the changed data D1 in the HDD 330C, and stores data D2 in HDD 330B.

Figure 15:
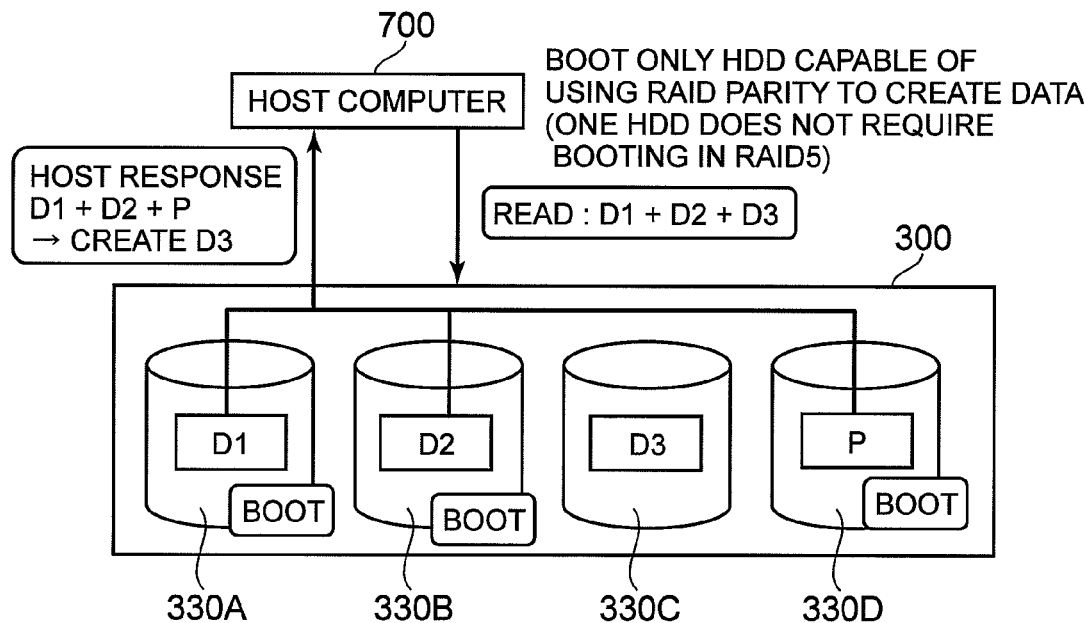
FIG. 15 is a third diagram illustrating the selection of a spin-up targeted HDD according to an embodiment of the present invention.

Further, as shown in FIG. 15, when the RAID group 300 is configured as RAID5, in Step S37, the MPU 240 selects HDD 330A, 330B and 330D as the HDD 330 targeted for spin-up if the power in the respective enclosures (main enclosure 100, expansion enclosure 400) added as a result of the spin-up of the HDD 330 set (for example, the set of HDD 330A, 330B, 330D) of a plurality of HDD capable of data recovery using parity data (in this example, three of the four HDD from the RAID group as a whole) is in a range of usable power values of the respective enclosures, and the spin-up times of HDD 330A, HDD 330B and HDD 330D are less than the host time-out times. The selectable HDD are not limited to these HDD, but rather the MPU 240 carries out selection by comparing the respective HDD transition times from the power-saving state to the normal state (the spin-up times) and the power required for transitioning from the power-saving state to the normal state (spin-up power), the response time-out time, and the usable power of the respective enclosures.

As a result, after spinning up HDD 330A, 330B and 330D, the MPU 240 reads out data D1 from HDD 330A, reads out data D2 from HDD 330B, reads out the parity data P from HDD 330D, supplements (creates) data D3 from the parity data P, data D1 and data D2, and sends data D1, D2 and D3 to the host computer 700. Consequently, starting up only a portion of the HDD 330 of the RAID group makes it possible to respond to the host computer 700 within the usable power values and without causing a host time-out.

Figure 16:
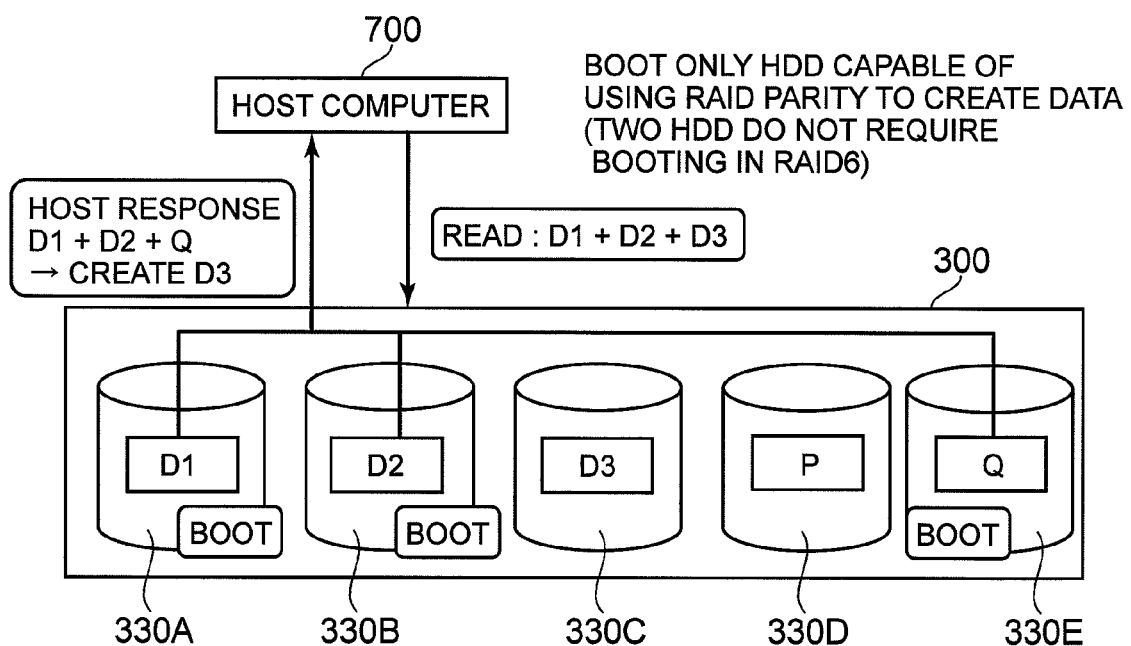
FIG. 16 is a fourth diagram illustrating the selection of a spin-up targeted HDD according to an embodiment of the present invention.

Further, as shown in FIG. 16, if the RAID group 300 is configured as RAID6, in Step S37 the MPU 240 selects HDD 330A, 330B and 330E as the HDD 330 targeted for spin-up if the power in the respective enclosures (main enclosure 100, expansion enclosure 400) added as a result of the spin-up of the HDD 330 set (for example, the set of HDD 330A, 330B, 330E) of a plurality of HDD capable of data recovery using parity data (in this example, three of the five HDD from the RAID group as a whole) is in the range of usable power values of the respective enclosures, and the spin-up times of HDD 330A, HDD 330B and HDD 330E are less than the host time-out times. The selectable HDD are not limited to these HDD, but rather the MPU 240 carries out selection by comparing the respective HDD transition times from the power-saving state to the normal state (the spin-up times) and the power required for transitioning from the power-saving state to the normal state (spin-up power), the response time-out time, and the usable power of the respective enclosures.

As a result, after spinning up HDD 330A, 330B and 330E, the MPU 240 reads out data D1 from HDD 330A, reads out data D2 from HDD 330B, reads out the parity data Q from HDD 330E, supplements (creates) data D3 from the parity data Q, data D1 and data D2, and sends data D1, D2 and D3 to the host computer 700. Consequently, starting up only a portion of the HDD 330 of the RAID group makes it possible to respond to the host computer 700 within the usable power values and without causing a host time-out.

The preceding is an explanation of the present invention based on the embodiment, but the present invention is not limited to the above-described embodiment, and can be employed in a variety of other modes.

For example, in the embodiment described hereinabove, when there is even one LU that has not been configured to the power-saving mode inside the same RAID group, the HDD 330 inside the pertinent RAID group are not set to the power-saving state, but the present invention is not limited to this, and can be constituted such that when just one LU has been configured to the power-saving mode inside the same RAID group, the HDD 330 inside the pertinent RAID group are set to the power-saving state when a prescribed power-saving condition has been met.

Further, in the above-described embodiment, an example is given in which RAID groups are divided up by enclosure, but the present invention is not limited to this, and can be constituted such that a plurality of HDD disposed in a plurality of enclosures is configured as the same RAID group.

Further, in the above-described embodiment, an example is given in which LU are created in a RAID group, but the present invention is not limited to this, and, for example, can be constituted such that LU are created in a pool of storage capacity that brings together the storage areas of a plurality of RAID groups.

Further, in the above-described embodiment, when it is not possible to spin-up all of the target-LU HDD in the power-saving state (Step S34: NO), processing following on from Step S37 continues, but the present invention is not limited to this, and, for example, the constitution can be such that, subsequent to Step S33, processing may proceed to Step S37 without carrying out Step S34. By so doing, it is possible to curb spin-up power more than when all the target-LU HDD 330 in the power-saving state are spun up, allowing, for example, the power saved thereby to be utilized when spinning up the other HDD 330 in response to another host access.

What is claimed is:

1. A storage apparatus, which can control access targeted at a logical unit configured from a plurality of disk devices, the disk drives configuring a RAID group, comprising:
   a receiving unit that receives an access command targeting a storage area of the logical unit;
   a state determination unit that determines whether or not a response to the access command can be made via one or more access-enabled disk devices of the plurality of disk devices configuring the logical unit;
   a power value acquisition unit, in response to a determination that the response to the access command cannot be made because the disk drives are in a power-saving state, acquires a value of power capable of being used to spin up all of disk devices in the RAID group; and
   a selection unit that if the value of power by the power value acquisition unit is within a range of usable power values, selects all of the disk drives in the power-saving state to spin up, otherwise selects less than all the disk drives to make the response to spin up from all of the disk drives in a power-saving state in ascending order according to their spin-up times; and
   wherein the number of the disk drives necessary to make the response to spin up is determined based on redundancy of the RAID group.

2. The storage apparatus according to claim 1, further comprising an augmentation power value storage unit that stores an augmentation power value to spin up each of the disk devices whose state is in the power-saving state, wherein
   the power acquisition unit, based on the augmentation power value stored in the augmentation power value storage unit, determines if the value of power by the power value acquisition unit is within a range of usable power values.

3. The storage apparatus according to claim 1, comprising:
a first transition controller that transitions one or more selected disk devices to the access-enabled state; and
a response execution unit that carries out a response to the access command using one or more disk devices that have transitioned to the access-enabled state.

4. The storage apparatus according to claim 3, further comprising a second transition controller that transitions, after transitioning to an access-enabled state the one or more disk devices selected as the target to be transitioned to the access-enabled state, remaining power-saving state disk devices of the logical unit targeted by the access command to the access-enabled state.

5. The storage apparatus according to claim 4, further comprising a reflection unit that reflects data corresponding to the access command to one or more disk devices in which an access command-based change has not been reflected, subsequent to transitioning to the access-enabled state all the disk devices of the logical unit targeted by the access command.

6. The storage apparatus according to claim 1; wherein the logical unit targeted by the access command is created in a RAID group of either RAID5 or RAID6.

7. The storage apparatus according to claim 1, wherein the power-saving state is a state that suspends rotation of a disk of the disk device.

8. The storage apparatus according to claim 7, further comprising:
a measurement unit that measures the actual spin-up time of the disk devices; and
a history storage unit that stores a history of the actual spin-up times, wherein the selection unit utilizes a time based on an actual spin-up time recorded in the history storage unit as the spin-up time.

9. A disk device control method of a storage apparatus, which can control access targeted at a logical unit configured from a plurality of disk devices, the disk devices configuring a RAID group,
the method comprising:
a receiving step of receiving an access command that targets a storage area of the logical unit;
a state determination step of determining whether or not it is possible to respond to the access command using one or more disk devices in the access-enabled state from among the plurality of disk devices configuring the logical unit;
a power acquisition step of, in response to the determination that the response to the access command cannot be made because the disk drives are in a power-saving state, acquiring a value of power capable of being used to spin up all of disk devices in the RAID group;
a selection step of, if the value of power by the power value acquisition unit is within a range of usable power values, selecting all of the disk drives in the power-saving state to spin up, otherwise, selecting less than all the disk drives to make the response to spin up from all of the disk drives in a power-saving state in ascending order according to their spin-up times,
wherein the number of the disk drives necessary to make the response to spin up is determined based on redundancy of the RAID group.

* * * * *